United States Patent [19]
Wolf

[11] Patent Number: 4,970,657
[45] Date of Patent: Nov. 13, 1990

[54] EXPERT KNOWLEDGE SYSTEM DEVELOPMENT TOOL

[75] Inventor: Daniel Wolf, Port Hueneme, Calif.

[73] Assignee: U.S. Advanced Technologies, N. V., Antilles, Netherlands Antilles

[21] Appl. No.: 416,702

[22] Filed: Oct. 3, 1989

Related U.S. Application Data

[63] Continuation of Ser. No. 296,311, Jan. 6, 1989, abandoned, which is a continuation of Ser. No. 4,969, Jan. 20, 1987, abandoned.

[51] Int. Cl.$^5$ .............................................. G06F 15/18
[52] U.S. Cl. .................................. 364/513; 364/200; 364/274.5; 364/274.7
[58] Field of Search ............ 364/300, 513, 200, 274.5, 364/274.7; 382/14, 15, 36, 37, 38

[56] References Cited

U.S. PATENT DOCUMENTS

| | | | |
|---|---|---|---|
| 4,570,848 | 6/1987 | Schramm | 364/513 |
| 4,591,983 | 5/1986 | Bennett et al. | 364/478 X |
| 4,628,434 | 12/1986 | Tashiro et al. | 364/300 X |
| 4,628,435 | 12/1986 | Tashiro et al. | 364/300 X |
| 4,642,782 | 2/1987 | Kemper et al. | 364/513 X |
| 4,648,044 | 3/1987 | Hardy et al. | 364/300 X |
| 4,649,515 | 3/1987 | Thompson et al. | 364/300 X |
| 4,658,370 | 9/1987 | Suman et al. | 364/513 |
| 4,752,889 | 6/1988 | Rappaport et al. | 364/513 |
| 4,763,277 | 8/1988 | Ashford et al. | 364/513 |
| 4,779,208 | 10/1988 | Tsuruta et al. | 364/513 |

OTHER PUBLICATIONS

"Artificial Intelligence," E. Rich, McGraw-Hill, 1983 pp. 1-196.
"Artificial Intelligence," Winston et al., vol. 1, MIT Press, 1979, pp. 1-229.

Primary Examiner—John R. Lastova
Attorney, Agent, or Firm—Fliesler, Dubb, Meyer & Lovejoy

[57] ABSTRACT

An apparatus and method for an expert knowledge system developmental tool 50 comprising a computer 52 with a structure for storing a knowledge base 54 and an inference engine 56 for inferring from the knowledge base 54. The knowledge base 54 defines a plurality of positive and negative rules 402,410, each rule having one or more antecedents 302 and one conclusion 328. The interference engine 56 includes structure 100 for storing a hypothesis list and structure 100 for selecting rules that have a conclusion which match each hypothesis and the negative of each hypothesis. Further, the inference engine 56 includes structure 116-150 for analyzing the selected rules 402, 410 with respect to each other in order to determine a value of each hypothesis, and structure 162-184 for analyzing the antecedent 302 of each rule to determine a value for each rule 402, 410.

31 Claims, 8 Drawing Sheets

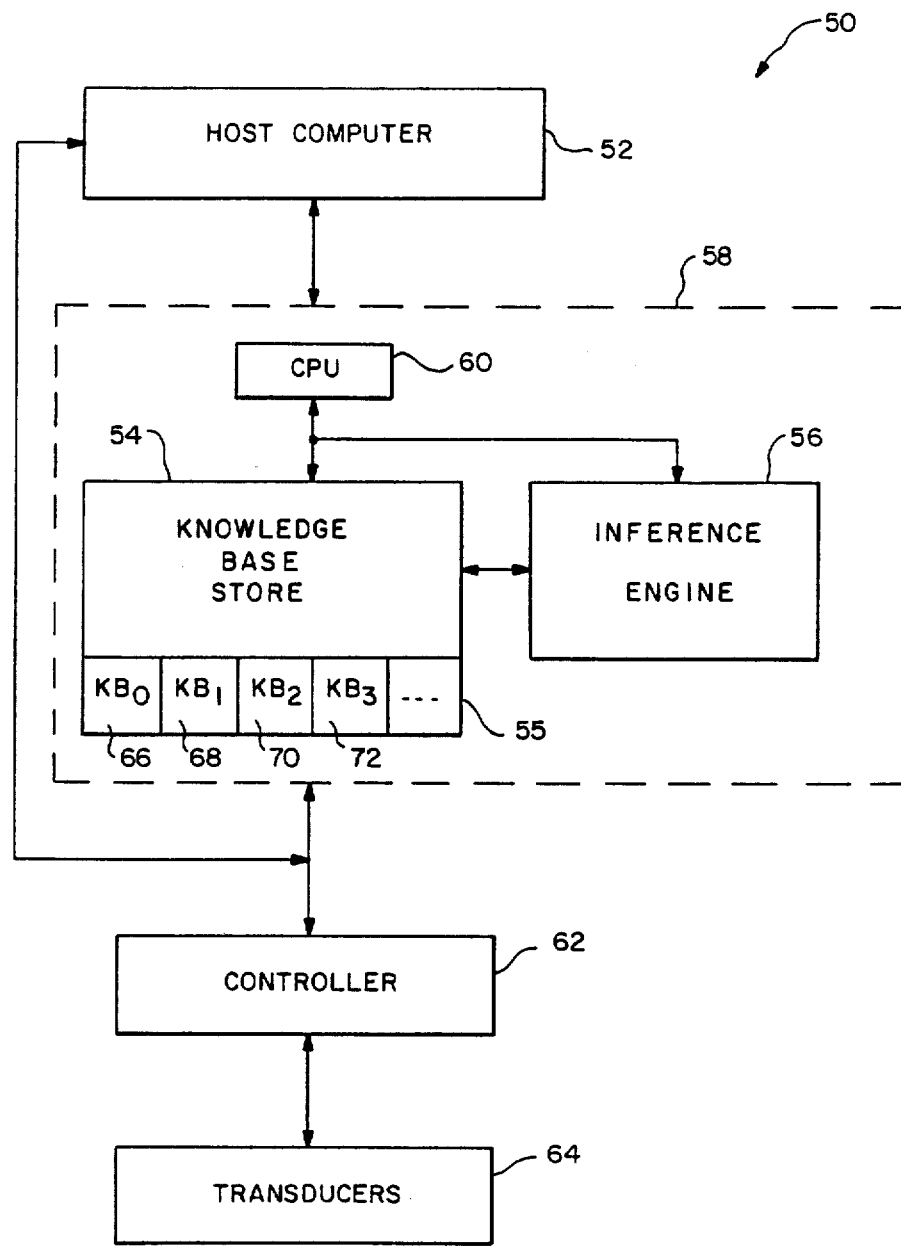
FIG.—1

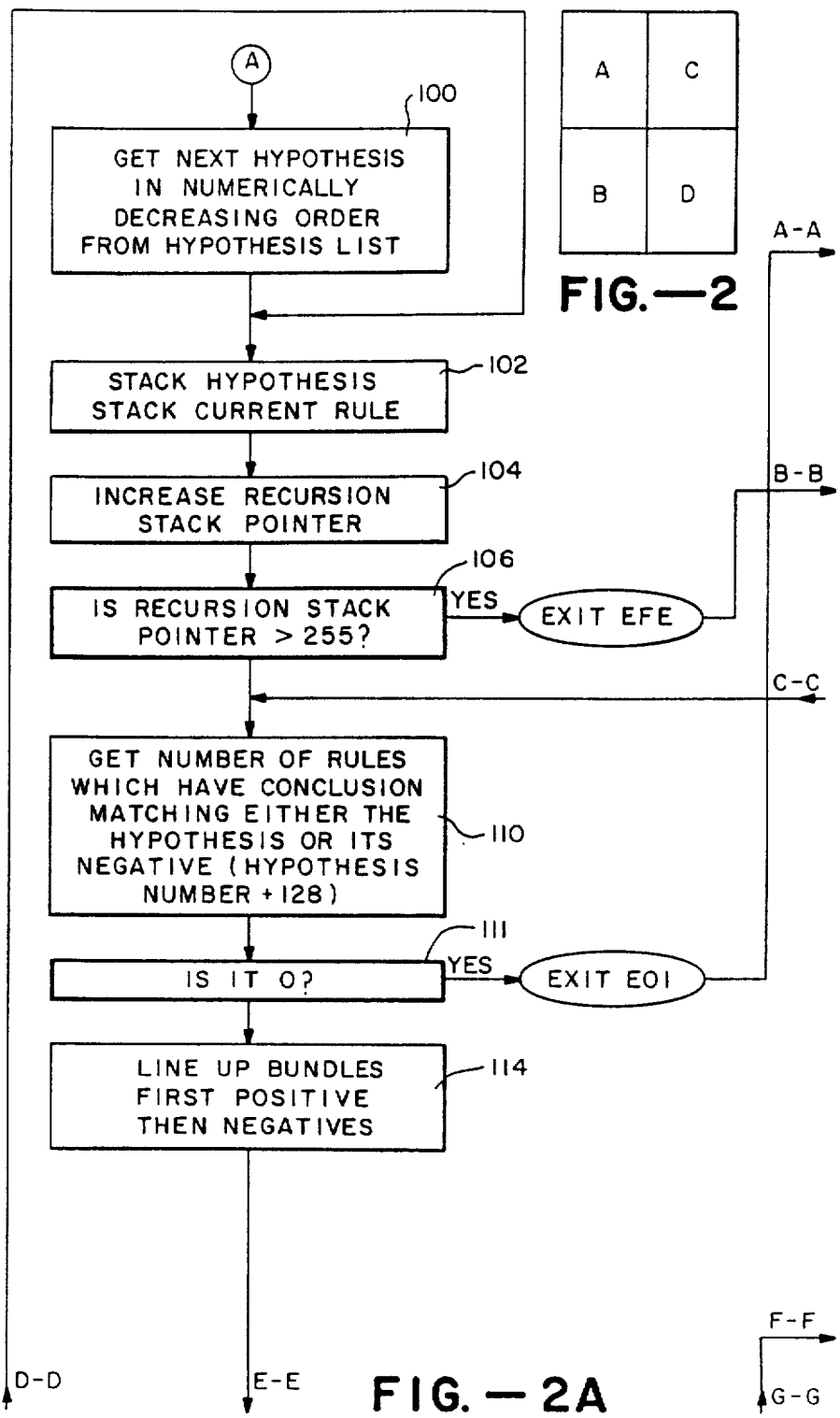

AUTOMATIC HYPOTHESIS LIST GENERATION 200

DEFINITIONS: 204
- TYPE=0: ALL VARIABLES WHICH DO NOT APPEAR AT ALL IN THE RULES
- TYPE=1: ALL VARIABLES WHICH ONLY APPEAR AS RULE CONCLUSIONS
- TYPE=2: ALL VARIABLES WHICH ONLY APPEAR AS RULE ANTECEDENTS
- TYPE=3: ALL VARIABLES WHICH APPEAR AS BOTH CONCLUSIONS AND ANTECEDENTS

FOR EACH VARIABLE, SET ITS "TYPE"=0

↓

SET ALL HYPOTHESIS #'S = 0    206

↓

LAY OUT A LIST OF ALL 256 RULE CONCLUSION VARIABLES    208

↓

GO THROUGH THE "CONCLUSION" LIST: FOR EACH VARIABLE # FOUND THERE, SET THAT VARIABLE'S "TYPE" = 1    210

↓

FOR EACH VARIABLE, SEE IF IT EVER APPEARS AS A RULE ANTECEDENT IN ANY RULE: IF SO, ADD 2 TO THAT VARIABLE'S "TYPE"

THE RESULT OF STEPS 1-5 IS A LIST OF VARIABLE "TYPE" NUMBERS (0-3)    212

↓

STARTING WITH # 0, LOOK A EACH VARIABLE'S "TYPE": IF "TYPE" = 1 THEN ADD THAT VARIABLE TO THE HYPOTHESIS LIST    214

↓

COUNT HOW MANY VARIABLES HAVE "TYPE" = 1: SET NUMBER OF HYPOTHESES = THIS COUNT    216

↓

AUTOMATIC HYPOTHESIS LIST NOW COMPLETE    218

FIG.–3

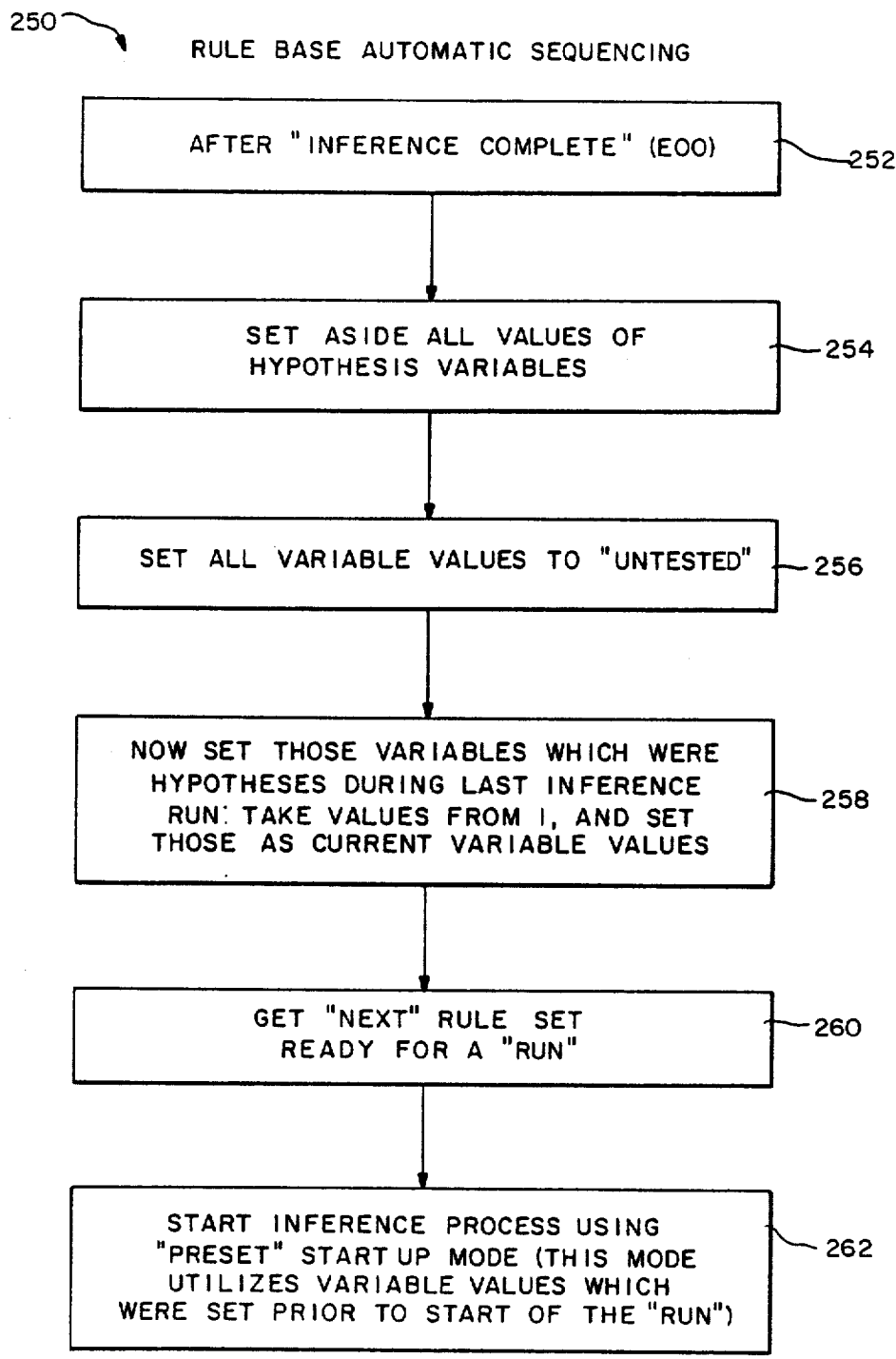
FIG.—4

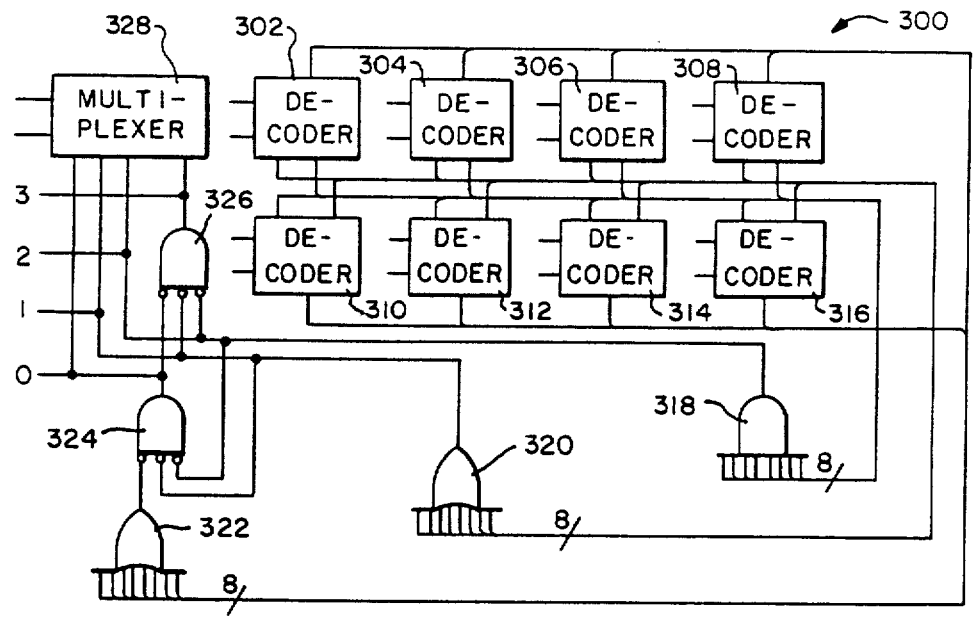
FIG. — 5
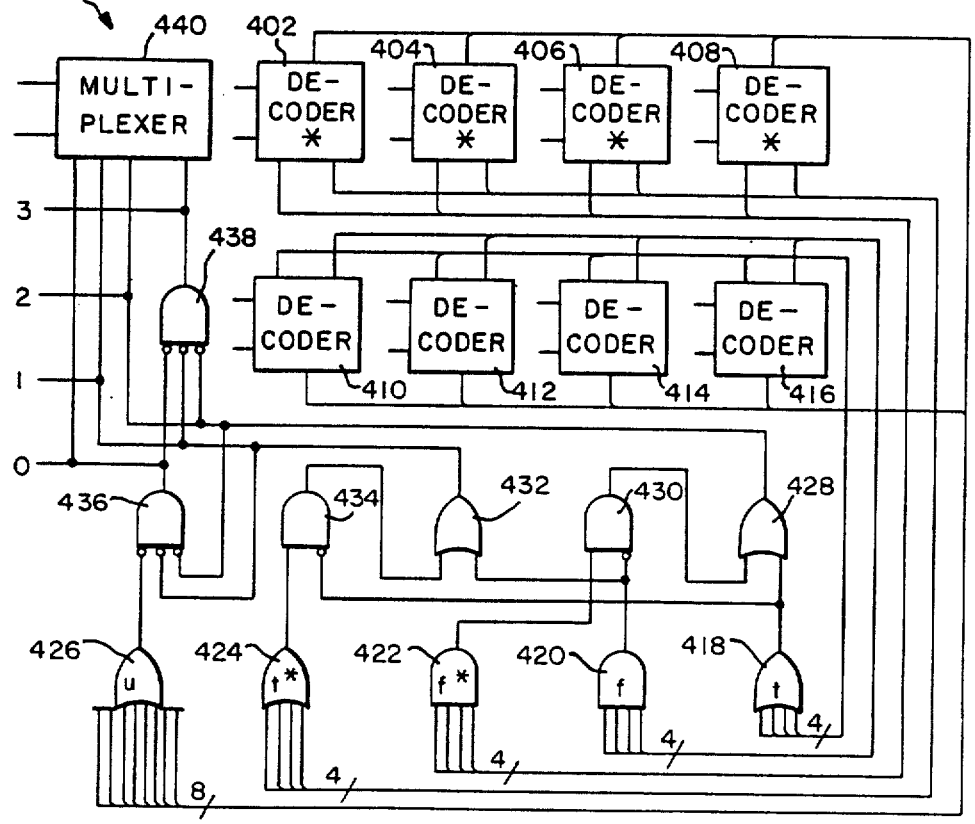
FIG. — 6

EXPERT KNOWLEDGE SYSTEM DEVELOPMENT TOOL

This application is a continuation of application Ser. No. 07/276,311, filed Jan. 6, 1989, which is a continuation of Ser. No. 07/004,969, filed Jan. 20, 1987 both now abandoned.

BACKGROUND OF THE INVENTION

The present invention relates to an expert knowledge system and in particular to a development tool for creating a rule-based expert knowledge system which makes inferences using the rules. As a general background to expert knowledge systems and development tools, reference is made to the books, *A Guide to Expert Systems*, by Donald A. Waterman, Addison-Wesley Publishing Company, Menlo Park, Calif., 1986, and *Expert Systems* by Paul Harmon and David King, John Wiley and Sons, Inc., N.Y., 1985.

In the prior art there are a number of traditional approaches to rule-based knowledge systems. The first and probably most famous is known as MYCIN which was developed at Stanford University in the 1970's. This expert system is used as an aid to physicians in diagnosis of blood infections. This system was built with the use of a knowledge base and an inference engine. The knowledge base is a memory structure or store which consists of rules, facts, and heuristics about the expert subject matter. The inference engine establishes the procedures by which inferencing will occur based on the information contained in the knowledge base. The inference engine in MYCIN, for example, uses backward chaining through the rules starting with the conclusions or goals (disease diagnoses) of the rules and working backwards through the antecedents or "if" clauses of the rules. Other techniques such as forward chaining, modus ponens, are possible.

The MYCIN system and other existing rule-based expert systems tend to be large and require large well-supported computer facilities in order to handle the memory and processing requirements of the inefficient languages which are used. The structure for representing the knowledge base is generally quite large and complicated to program and reprogram in order to extend the capabilities of the expert system.

Such systems, while offering general solutions to expert system problems, are not suited for a real-world, real-time environment such as, for example, found on an assembly line or in the operation of a piece of equipment. In these situations, there is a requirement that a system be immediately responsive to the needs of the environment, perhaps having to analyze hundreds and thousands of rules in a second yet be small and cost effective for the environment of product manufacture. Accordingly, the system must be efficient and compact in order to act quickly and in order to be economically feasible to move from a university or research facility-environment to, for example, an on-line production environment.

A problem which faces every expert system is that of efficiently handling the great volume of information which constitutes the knowledge of an expert which is embodied in the knowledge base and the difficulty in assigning values to the rules in the knowledge base. Rule-based expert systems in general can value a variable, as for example a rule conclusion, as being true or false. Some are able to assign a certainty factor to whether a variable is true or false. However, as can be understood, oftentimes it cannot be determined whether a variable is true or false.

Besides being able to properly characterize the rules and information contained in the knowledge base, there is a requirement that the inference engine be able to efficiently analyze and the information so that, with the information given in the knowledge base, conclusions can be reached which may not have been initially anticipated. Prior expert systems have not always been able to analyze the knowledge base in order to optimally use the information contained therein. Further, as the knowledge base can be quite extensive, even in a small system, there is a need to prune the knowledge base in an efficient manner so that only the appropriate portions of the knowledge base are used to address the required analysis.

Further, while existing systems and system languages such as Lisp can accommodate both positive and negative variables (classic two valued logic systems), these systems are unable to handle negative rules. These systems are unable to evaluate a second negative logical pathway in addition to the first logical pathway of positive rules.

The present invention is directed to overcoming the disadvantages of prior systems and providing a compact, efficient expert knowledge system suitable for real-time use in, for example, a production environment.

SUMMARY OF THE INVENTION

The present invention includes an apparatus and method for providing an expert knowledge system development tool comprising a computer with a structure for storing a knowledge base and an inference engine structure for inferring from the knowledge base.

The knowledge base structure can store a plurality of positive and negative rules where each rule includes at least one antecedent variable and one conclusion variable. The knowledge base structure can establish and store a hypothesis variable list comprised of some of the conclusion variables. This tool includes a structure for selecting rules that have conclusions that match each hypothesis and the negative of each hypothesis. This tool further includes a structure for analyzing a bundle of selected rules as a whole in order to determine a variable value from common conclusions for each hypothesis variable or sub-hypothesis variable and also analyzing the antecedents of each rule in order to determine a variable value for each rule.

The present rule-based expert knowledge system development tool provides a compact knowledge base structure and ease of analysis of the knowledge base in order to efficiently, and on a real-time basis, address the questions or hypotheses posed by a real-world environment such as required for the safe operation of, for example, a manufacturing line, or the operation of a piece of equipment. Accordingly, the present invention provides a compact knowledge-base structure which can allow for the analysis of hundreds and thousands of rules in a second.

In order to account for more than True and/or False values which a rule or variable may have, the present tool allows for a rule or variable to have the third and fourth values or states of Unknown and Untested. In comparison to the classical two valued systems using only true and false, these four states allow for great flexibility in the analysis accomplished.

The unknown value is a value which designates that judgment or evaluation is to be deferred until later in the inferencing process. At a later date other results of the inferencing process or information from the outside environment can be used to assign another value in place of the unknown value.

Still further, the knowledge base of the present system allows for negative rules which can lead to conclusions which are the opposite of the positive rules. The use of negative rules allows the development tool to have a second very powerful logical pathway for evaluating a given situation. Often this second logical pathway in addition to the first logical pathway comprised of positive rules is able to inference to a conclusion that would not be possible with the first logical pathway. The tool provides for sorting the rules into a bundle of positive rules and a bundle of negative rules in order to efficiently inference first on the bundle of positive rules and then on the bundle of negative rules. With the use of negative rules inferencing without sorting would require that both negative and positive rules be inferenced at the same time, an inefficient task at best.

Further, the present invention allows for an efficient use of both of the backward chaining and forward chaining inferencing techniques specially designed for the four valued logic structures of the invention in order to quickly determine what is true, false, unknown, and untested, and to quickly prune down the size of the rule base. The present invention, through a forward chaining technique, is able to efficiently prune a logic tree described by a bundle of rules such that the irrelevant sections of the tree will not be addressed. The backward chaining inferencing technique also uses a pruning technique, through only on a selected bundle of rules, not on the entire knowledge base as is accomplished with the forward chaining inferencing technique. The forward chaining inferencing technique assigns values to rules based on the antecedent variable of the rules irrespective of the relativeness or sequence of the rules. The results of the forward chaining inferencing technique, which assigns values to the rules, can be used by the backward chaining inferencing technique that assigns values to the hypotheses.

The present invention provides for alternatingly forward chaining through the antecedents of each rule in order to determine the value of the conclusion, and for backward chaining among rule conclusions or goals which match each required hypothesis on the hypothesis list in order to greatly enhance the inferencing process.

The present invention additionally provides for an automatic hypothesis list generation structure for locating all logical variables (1) which are only rule conclusions and do not appear additionally as antecedents for other rules, (2) which are both conclusions and antecedents, and (3) which are only antecedent, in order to automate the inferencing process by determining the top and the bottom of the logic tree. This structure accomplishes automatic hypothesis list generation prior to any other inferencing. Accordingly a user of the tool and the system developed with the tool is not required to manual scan the entire knowledge base in order to make a hypothesis list.

Further, the present invention provides for a plurality of knowledge base structures and a structure for sequencing automatically between the knowledge base structures. This sequencing structure provides that the determined hypothesis variable values for one structure are used as the reset or input values in the next structure. Accordingly, a problem can be broken down into separate, compact and efficient knowledge base structures or modules which are convenient and easy to program and modify, and with each structure building on the results obtained from the previous structure.

BRIEF DESCRIPTION OF THE DRAWINGS

FIG. 1 is a block diagram of an expert knowledge system development tool in accordance with the invention.

FIGS. 2, 2A, 2B, 2C and 2D represent a schematical block diagram and flow chart depicting the inferencing methodology and structure of the present invention.

FIG. 3 represents a block diagram and schematic flow chart depicting the methodology and structure of an automatic hypothesis list generation aspect of the present invention.

FIG. 4 depicts a block diagram and schematic flow chart depicting the methodology and structure of the automatic sequencing aspect of the invention.

FIG. 5 depicts a block diagram and schematic flow chart of the methodology and structure for single rule evaluation from eight antecedent variables.

FIG. 6 represents a block diagram and schematic flow chart depicting the methodology and structure for evaluation between eight rules, four of which represent positive rules and four of which represent negative rules, in accordance with an embodiment of the present invention.

DETAILED DESCRIPTION OF THE PREFERRED EMBODIMENT

Figure 2B:
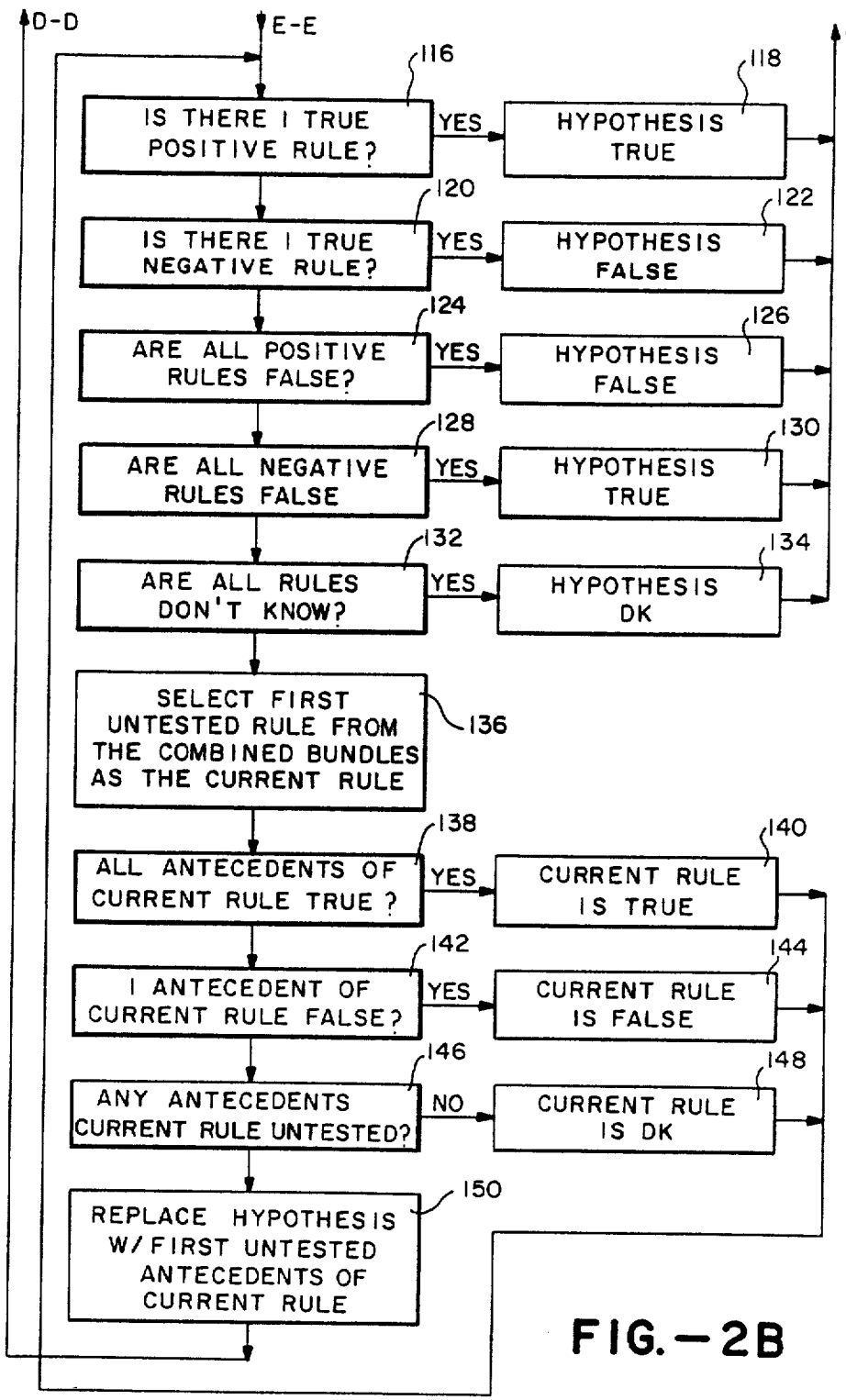
Figure 2C:
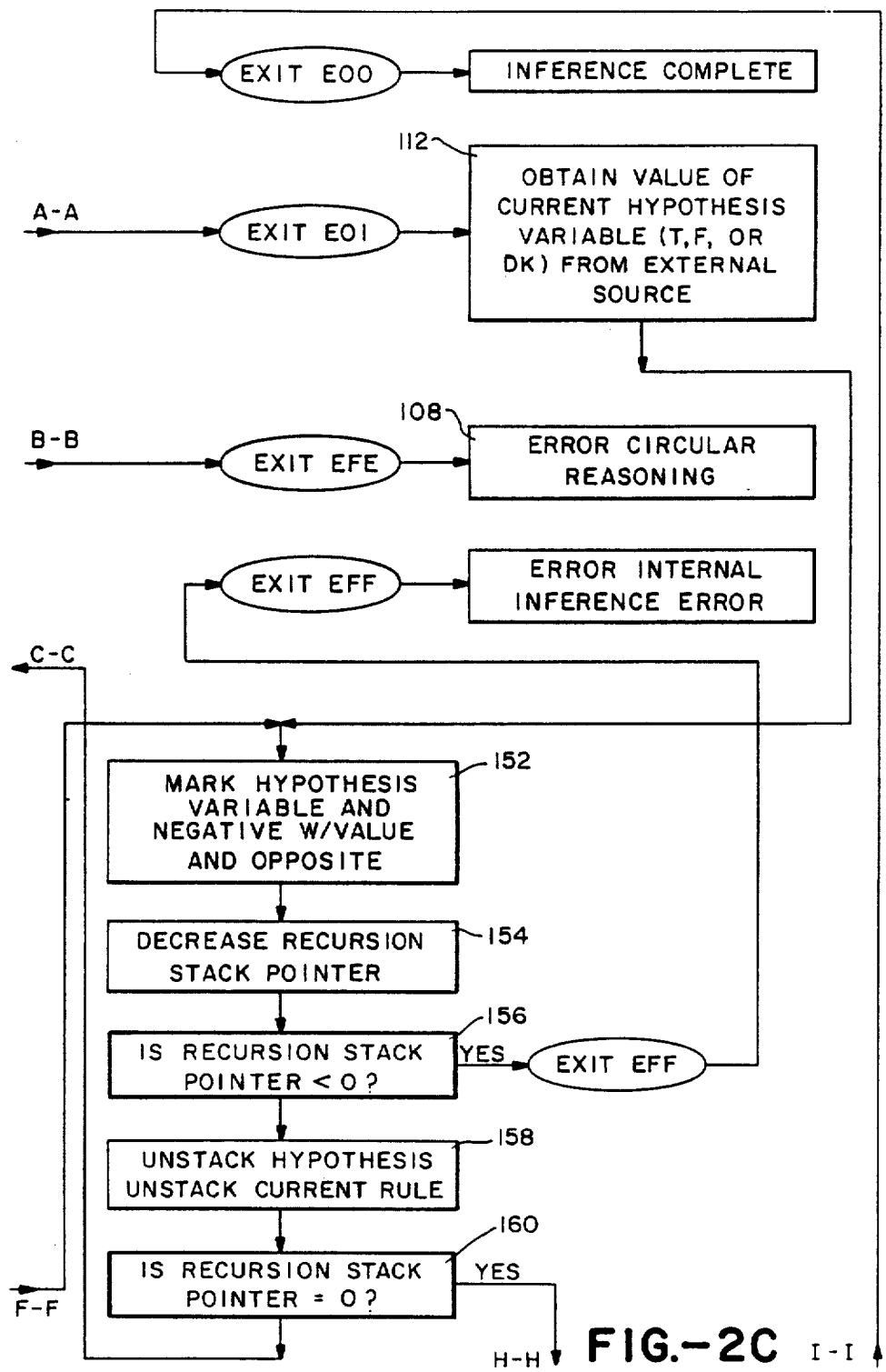

With reference to the figures, and in particular to FIG. 1, an example of a preferred embodiment of the present invention is depicted and identified by the number 50. The expert knowledge system development tool 50 of the invention, for use in developing an expert knowledge system, includes a host computer 52, a knowledge base store 54 for the knowledge base structure, and an inference engine 56. The knowledge base store 54 and the inference engine 56 can be presented in a stand-alone unit 58 which includes a central processing unit (CPU) 60 and/or can be incorporated directly into the host computer 52. Communicating with both the host computer 52 and the unit 58 is a controller 62 which communicates both with the unit 58 containing the knowledge base store 54 and the inference engine 56, and the host computer 52. The controller 62 communicates with transducers 64 to sample and environment in order to gather values for the knowledge base store 54. Additionally, the controller 62 which has its own on-board CPU, can initiate action based on the expert inferencing which has occurred. It is to be understood that values for the various rules can be sampled either through the transducer 64 or can be input directly by a user through the host computer 52.

As will be explained in greater detail, the transducer 64 can be, for example, used to monitor the various states and values which are important for the proper operation of, for example, a turbine used to generate power, equipment used in an assembly line, the entire assembly line itself, or the proper operation of a dryer to insure that a fire does not occur.

The knowledge base 54 contains all the information, rules, etc. that the expert knowledge system (as for example, a system for the above turbine) is based upon. The inference engine 56 logically interprets the information contained in the knowledge base 54. Further, the knowledge base 54 can include a plurality of knowledge base modules collectively referred to by the number 55 and individually referred to by the numbers 66, 68, 70, 72, etc.

The knowledge base module 66, in a preferred embodiment contains a dictionary of 127 logical variable names, and a rule list of 225 "if . . . then" rules. A rule is comprised of a list structure which in a preferred embodiment can have up to seven antecedents, or "if" variables, or slots, and one conclusion, or "then" variable. If any antecedent slot is empty, it is assigned a variable 0, a blank. In the following example of a rule, found in Chart 1, only six antecedents were used, so antecedent #6, which is permanently empty contains variable 0.

Rule conclusion values are assigned by inferencing engine 56 according to the values of antecedents, according to the following sequence of logic determination as shown in Chart 2.

CHART 2

First: If all the antecedents of a rule are True, the rule conclusion is True.

Second: If any antecedents of a rule are False, the rule conclusion is False.

Third: If any antecedents are Untested, the rule conclusion remains Untested.

Fourth: If all antecedents are Unknown, the rule conclusion is Unknown.

Conclusion variable values for a rule can also be assigned according to the values of other rules or of a

CHART 1

|   | | CONCLUSION | (VARIABLE 1) |
|---|---|---|---|
| 1 | SHUTDOWN TURBINE | | |
| 8 | LEVEL = PEAK | ANTECEDENT #0 | (Variable 8) |
| 12 | PROBE = ACCELERATION | ANTECEDENT #1 | (Variable 12) |
| 14 | LOCATION = CASING | ANTECEDENT #2 | (Variable 14) |
| 46 | G'S = 5 | ANTECEDENT #3 | (Variable 46) |
| 24 | BASIS = VIBRATION | ANTECEDENT #4 | (Variable 24) |
| 49 | SPECTRUM = SPEED | ANTECEDENT #5 | (Variable 49) |
| 0 | | ANTECEDENT #6 | (Variable 0) |

Chart 1 contains a rule which can be used to determine by inferencing to the conclusion (Variable 1) whether or not a turbine should be shut down. This determination is made by evaluating the values of the antecedents which may or may not already have preassigned values In Chart 1, the descriptions of the conclusion and the antecedents is shown in Column 2. These descriptions are known as the logical variable names. Column four would contain the value for each variable if that value has been preassigned. These values are inserted as the inferencing process assigns the value.

The inference engine 56 operates the knowledge base 54 (whether fully or partially determined with values). Each of the variables (which can be either conclusions and/or antecedents) in the dictionary of 127 variables has a negative image or variable, a logical negative. The negative always has the number of the positive, plus 128. For example, the negative of variable 5 is variable 133. Like variable 0 which is empty or blank, variable 128 (Not empty) is also empty or blank. Each rule is analyzed or evaluated by evaluating the antecedents in numerically decreasing order, i.e., antecedent 6, 5 . . . 0.

The present invention provides for four-valued logical evaluation of rule conclusions and antecedents. The variable values of both rule conclusions and antecedents can be assigned logic values of True, False, or Unknown (or UNK, Don't Know, DK). Further the value of Untested (UNT) is assigned in the absence of any other of the above three assigned value. Values are assigned through the inferencing mechanism or through use of information obtained from the outside environment or user. This outside information may be obtained from human or transducer (e.g., electromechanical) input.

Whenever a value is assigned to a variable, the opposite value is assigned to the negative of that variable:

| Positive Variable Assigned Value of: | T | F | DK | UNT |
|---|---|---|---|---|
| Negative Variable Assigned value of: | F | T | DK | UNT | bundle of rules which have conclusions matching either the rule's conclusion variable or its negative. The sequence of logic determinations as shown in Chart 3 is used:

CHART 3

First: If one rule in the positive bundle is True, the conclusion variable is True.

Second: If one rule in the negative bundle is True, the conclusion variable is False.

Third: If all rules in the positive bundle are False, the conclusion variable is False.

Fourth: If all rules in the negative bundle are False, the conclusion variable is True.

Fifth: If all rules in the bundle are Unknown, the conclusion variable remains Unknown.

Sixth: If some rules in the bundle are Untested, the conclusion variable remains Untested.

This sequence demonstrates that either bundle of rules, either the positive bundle or the negative bundle of rules, is sufficient to evaluate a variable. It also shows that the positive bundle of rules has priority in having impact on the evaluation of the variable value.

The two sequences (Charts 3 and 4) together show the evaluation structure of the invention as more fully depicted and described with respect to FIGS. 2A, 2B, 2C and 2D.

The knowledge base stored in store 54 can be depicted (Chart 4) to show input/out-put relationships between the variables which are antecedents and/or conclusions. Chart 4 shows four rule numbers at the top, and seven dictionary variable numbers arranged vertically at the far left. For each variable number there is one horizontal line extending to the right completely across the chart. A total of seven horizontal lines appear in Chart 4. Some of these lines represent inputs, some represent outputs and others represent both.

INPUTS ARE: Those variables which occur only as antecedents in rules.

OUTPUTS ARE: Those variables which occur only as conclusions of rules.

BOTH ARE: Variables which occur as both antecedents and conclusions.

puts are in the middle and input variables are at the bottom of the diagram.

CHART 4

```
VARIABLE
NUMBERS                          RULES 3         76       75          22
           | | | | | |   | O | | | | | | | O | | | | | | | O | | | | | | | | O
    030_____  | |_____  | |_____  | |_ | | | | | | | |_
    029_____  |_____  |_____  | |_ | | | | | | | |_
    028_____  |_____  |_____  |___ | | | | | | |___
    027_____  |_____  |  ._____  |___ | | | | | |
      .                 |           |           |       | | | | | |
      .                 |           |           |       | | | | | |
      .                 |           |           |       | | | | | |
    080_____  |_____  |_____  |___ | | | | | |___
    079_____  |_____  |_____  |___ | | | | | |___
    078_____  |_____  |_____  |___ | | | | | |___
```

Each of the four rule numbers shown at the top of Chart 4 is also represented by seven vertical lines (slashes) with a circle to the right. This rule symbol represents the seven antecedent slots (numbered 6 to 0, left to right) and the conclusion (the circle). Beneath each rule entry slot is a vertical line (comprised of slashes) extending part or all the way down Chart 4. If the slot is filled by a dictionary variable, the vertical line will extend down to intersect with the horizontal line corresponding to that variable.

If a rule slot is empty, no vertical line will appear. A vertical line extending beyond the bottom of the chart means that it connects to some other dictionary variable that is visible on a chart which includes all 127 dictionary variables.

Chart 4 is just a window to the full knowledge base diagram. In a full diagram, scrolling left or right presents additional rules and connections. Scrolling up and down brings into view more dictionary variable names and their connections to the rules.

When the diagram is created, the dictionary variables and rules are placed in the most logical position for each knowledge base. As described earlier, the dictionary of variable names is broken up into three parts: input, output, and both. Within each of these groups, the variables are put into numerical order. All of the outputs appear at the top of the diagram, both inputs and out- The rules are organized so that those which have the same conclusions are viewed next to each other. Rules that have the highest numbered output variable for its conclusions are placed at the far left, then come rules with the next highest output variable as its conclusions, etc. In the sample diagram, rule three has variable 30 as its conclusion. Rules 76, 75, 22 come next because these rules all have variable 29 as common conclusion.

The inferencing process carried on by the inference engine 56 can be represented as seen in Chart 5 which is a four-window display. The windows each present a portion of information about which is occurring in the inference engine 56.

CHART 5
INFERENCE ENGINE DIAGRAM

| QUESTION | GOAL PATH |
|---|---|
| T-TRUE, F-FALSE, DK-UNKNOWN UNT-UNTESTED | |
| Is it True that: | SHUTDOWN TURBINE |
| | CHANGE TURBINE SPEED |
| MILS=3 OR VELOCITY = 0.25 | INCREASE TURBINE SPEED |
| | ADVISE FOUNDATION RESONANCE |
| WINDOW 1 | WINDOW 2 |

| APPLYING RULE 217 | CONCLUSIONS |
|---|---|
| LOCATION = SHAFT | ? ADVISE TORSIONAL CR |
| SPECTRUM = 3 X SPEED | ? PROBLEM AT SURGE |
| SPECTRUM = ARBITRARY | − ACCELERATION = 0.5 G'S |
| SPECTRUM = RISING AND FALLING | − MILS = 50 |
| MILS = 3 OR VELOCITY − 0.25 | + /SPECTRUM = ELECTRICAL POWER |
| | + SPECTRUM = 1 X SPEED |
| | − /SPECTRUM = NOISE FLOOR |
| ADVISE FOUNDATION RESONANCE | − ADVISE LOST DEFLECTOR |
| WINDOW 3 | WINDOW 4 |

CHART 5 SUMMARY

GOAL PATH Linkage of rule conclusion variables leading to one of the hypotheses. Lowest one displayed without a value symbol is active.

APPLYING RULE Shows a rule which has a conclusion matching the active goal hypothesis.

QUESTION Shows an untested variable from the antecedents of the current rule.

CONCLUSIONS Shows variables with their value symbols concluded during the inference process.

| LOGICAL VALUE | SYMBOL |
|---|---|
| TRUE | + |

| LOGICAL VALUE | SYMBOL |
|---|---|
| FALSE | — |
| DEFERRED (UNKNOWN) | ? |
| UNTESTED | (Blank) |
| NOT | / |

Window 1 (upper left) displays whatever question (variable) is currently being asked by the inference engine 56. This question appears as an untested value and is a variable from the active rule being displayed (Window 3). A value of True, False, Unknown, or Untested is supplied by the environment or the user.

Window 2 (upper right) displays a goal path. This is a list of variables that represents a chain of conclusions leading to one of the questions (hypotheses). This chain typically has two to five levels, but can have as many as 128 levels. When the inference engine 56 begins evaluating a hypothesis, it searches for rules that might lead to a matching conclusion. Either conclusions or antecedents of these rules become sub-hypotheses and are grouped together in a stack (i.e., the goal path). The sub-hypothesis being evaluated is treated like a listed hypothesis, with the inference engine 56 searching for rules that have conclusions matching the sub-hypothesis.

This process of evaluating the hypothesis by finding matching rule conclusions, taking the antecedents of those rules as temporary sub-hypotheses, finding rules with conclusions matching the sub-hypothesis, and so on is called backward chaining and will be more fully described with respect to FIGS. 2A, 2B, 2C and 2D.

Window 3 (lower right) displays a list of conclusions These are the variables that have been evaluated and assigned logical values according to the rules and to answers given to questions. When the inferencing process begins, this window is blank.

Window 4 (lower left) depicts the rule currently being used to help evaluate one of the sub-hypotheses of the goal path. The conclusion (in this case "ADVISE FOUNDATION RESONANCE") always matches the sub-hypothesis (last listed variable with no value in window 2) being evaluated. The goal path items are evaluated beginning at the bottom. Eventually, some of the lower items depicted in goal path window 2 will show logical value symbols. The active item in the goal path window, the one which matches the conclusions, is always the lowest one without a value.

In FIGS. 2A, 2B, 2C and 2D, the structure of a preferred embodiment of the inference engine 56 is depicted. While it will be shown that the inferencing process can start in one of several locations, for simplicity the inference process is started in FIG. 2A with block 100. In block 100, the next hypothesis from the hypothesis list is obtained for evaluation. As there can be no more than 256 hypotheses for each knowledge base, as that is the number of rules and thus different conclusions which can be provided with each knowledge base, blocks 102, 104 and 106 are used to determine if the inferencing engine has exceeded the limit of the number of levels in the tree (maximum recursion depth) which can never exceed the maximum number of rules which in this embodiment is 256 rules. If this is the case, there is an exit to block 108 and an indication that there is a circular reasoning error in the inferencing caused by some error introduced into the knowledge base.

At block 110, the inference engine 56 obtains all the rules which have conclusions which match the current hypothesis or the negative of the current hypothesis, that is currently being determined. It is to be understood that the current hypothesis may be a sub-hypothesis located down in tree. If this number is 0 (block 111), then the system exits to block 112 which requires that either the user or the environment input a value for the current hypothesis or variable as none is stored in the knowledge base 54.

If less than all the conclusions match the hypotheses as determined by block 110, those rules which do not have matching conclusions are not analyzed by the system beginning at block 110 at FIG. 2A.

If there are rules with conclusions which match the hypothesis, these rules are ordered into two bundles, a first bundle which includes all the positive rules and a second bundle which includes all the negative rules (block 114).

As depicted at the top of FIG. 2B, the backward chaining or analysis between the values of the conclusions for the select rules is then accomplished. In backward chaining, inferencing is initiated by the conclusion or goal of the rule. The inference engine attempts to determine if the hypothesis is correct by comparing the hypothesis with values from similar conclusions of the selected rules. If this is not possible, the inferencing backs up to the antecedent clauses of each rule and tries to determine if these are correct. This in turn leads the inference engine to other rules which have conclusions which match the antecedents of the first rule to be analyzed. In this way, the backward chaining process proceeds down an ever broadening inference tree from one level to the next with the antecedents of the level above being the goals of the level below.

In FIG. 2B, the backward chaining inferencing is applied to the bundle of rules in the order and sequence provided below. First, at block 116 a determination is made as to whether there is one rule of the positive rules which has a True value. If this is the case, as the hypothesis is similar to the conclusion of the bundle of rules, the hypothesis variable is True and is so designated at block 118 and the inferencing exits to Block 152. Second, if necessary, a determination is made as to whether any one of the negative rules is True (block 120). If this is the case, the negative of the hypothesis, being equivalent to the conclusion of the negative rule, is True, and the hypothesis variable is accordingly designated to be False at block 122 and the inferencing exits to Block 152. Third, if necessary, a determination is made as to whether all positive rules are False at block 124. If all positive rules are False and the hypothesis matches the conclusion of all the positive rules, the hypothesis variable is false and so designated by block 126 and the inferencing exits to Block 152. Fourth, if necessary, the backward chaining inference makes the determination as to whether all the negative rules are False by block 128. If this is the case, using the reasoning recited immediately hereinabove, the hypothesis variable is true and is so designated by block 130 and the inferencing exits to Block 152. Fifth, if necessary, the inference engine asks whether all rules are of the value of Unknown (UNK or DK for Don't Know) at block 132. If this is the case, the hypothesis variable is given a value of Unknown at block 134. It is noted that a rule which has been tested may have on of three values of True, False or Unknown If a rule has not been tested, it is valued as Untested.

If there is no "yes" answer from any of the blocks 116, 120, 124, 128 or 132, there will remain one or more rules which have been Untested. These Untested rules are gathered at block 136 for testing by analyzing the antecedents of each Untested rule, in the order and sequence presented below, to determine if, based on the information in the knowledge base 54, the rule's value can be evaluated. This analysis begins at block 138 where first all antecedents of the first Untested rule are analyzed to determine if the rule is True. If all antecedents of the current rule being tested are True, the rule is True and is so designated by block 140 and the inferencing exits to Block 116.

Second, if necessary, a determination is made at block 142 as to whether any one antecedent of the current rule being tested is False. If this is the case, the rule being tested is False and is so designated by block 144 and the inferencing exits to Block 116. Third, if necessary, at block 146 a determination is made whether any of the antecedents of the current rule are Untested. If no antecedents are Untested, the rule has been tested but has not heretofore been indicated as False or True, and thus the rule has a value of Unknown (DK) as assigned by block 148 and the inferencing exits to Block 116. If the newly tested rule has been given a value or True, False, or Unknown by blocks 140, 144, or 148, the rule has been assigned a value appropriate for further backward chaining as represented in blocks 116, 120, 124, 128 and 132, and an appropriate signal is sent to these blocks to see if the hypothesis can be determined to be True, False, or Unknown. If the current rule which is presently being tested has antecedents which are Untested, backward chaining requires that these antecedents be tested by proceeding downwardly in the tree structure to the next lower and broader level where the antecedents just tested are conclusions of the rules of the lower level. This being the case, the hypothesis selected by block 100 in FIG. 2A is replaced by the first untested antecedent of the current rule being tested as selected by block 150 and the entire backward chaining process begins anew from block 100 through block 136 to see if the new sub-hypotheses can be determined as True, False, or Unknown.

It is to be understood that Blocks 138-150 accomplish pruning for the selected rules for the bundle under consideration, while Blocks 162-182 as discussed hereinbelow accomplish pruning for all the rules in the knowledge base.

Returning to blocks 118, 122, 126, 130 and 134, and assuming that, with backward chaining, the hypothesis has been determined to be True, False, or Unknown, the inference engine proceeds to the structure of block 152. At block 152, the hypothesis just tested is marked True, False, or Unknown and the negative conclusion of the hypothesis is marked with the opposite value. At block 152, any value for the current hypothesis which has been obtained from an external source is introduced from block 112. Blocks 154, 158 and 160 account for any remaining upward inferencing steps (returning up the tree) remaining in the evaluation of a listed hypothesis. If there are any upward steps which have not been taken, inferencing is returned from block 160 to block 110 so that the previous sub-hypothesis can be now examined in light of the data from the deeper excursion into the tree by backward chaining. Block 156 determines if there is an internal error which would occur if the tool tried to inference past the top of the tree.

It is to be understood that, while the forward chaining process described immediately hereinbelow is provided in a sequence following the backward chaining analysis, that the forward chaining as demonstrated in blocks 162 through 182 may occur prior to the initial backward chaining process. The advantage in accomplishing the forward chaining first is that it is possible to "prune" the inference tree from the bottom up by adding values to conclusions and antecedents based on the knowledge in the knowledge base. It can be appreciated that this ordering can save processing time during backward chaining. Thus, forward chaining is accomplished before any hypothesis is selected for analysis using the backward chaining technique above.

Blocks 162 through 182 value rules one at a time with no recursion.

The inference engine 56 begins the forward chaining inferencing by setting a flag to 0 at block 162. The antecedents of each rule are then analyzed, in the following order and sequence, with blocks 164 and 182 indexing from rule to rule until all the rules have been analyzed. At block 166, if all antecedents of the current rule being analyzed are True, the rule is True and a value of True is assigned to the conclusion of the rule by block 168 and the inferencing process exits to Block 178. Second, if necessary, at block 170, if any one antecedent of the current rule is False, a False value is assigned to the conclusion of the rule by block 172 and the inferencing process exits to Block 181. Third, if necessary, if all antecedents of the current rule being analyzed have been tested, the rule is marked Unknown at block 176 and the inferencing process exits to Block 181. Otherwise the rule remains Untested. Such forward chaining rule analysis continues until all rules have been analyzed once. If during the analysis process at least one rule is determined to be True, the True signal is communicated to block 178 and block 180 where a flag is set to 1. After all rules have been analyzed once, block 182 tests to see if a flag has been set to 1. If this is the case, forward chaining from block 164 to block 182 begins anew to determine if any other rules can be valued as True, False or Unknown based on the True conclusion which was reached during the first forward chaining analysis. Any conclusion variables which are newly valued as True cause the forward chaining to again recycle on the rules. It is noted that inferencing which produces a False in Block 172 or an unknown in Block 176 does not cause forward chaining to again recycle through the rules as no information was learned that would help evaluate any other rule.

As long the forward chaining analysis produces more conclusions which can be designated as True, forward chaining continues. Once no new True conclusions are determined, block 178 determines that the conclusion value has already been determined to be True and bypasses the flag-setting block 180 stopping the forward chaining process. After forward chaining is complete, block 184 determines when any hypotheses of the hypothesis list are still untested. If that is the case, analysis returns to block 100 to begin on the next hypothesis. If no hypotheses remain untested, inferencing is over.

It is to be understood that reanalysis of forward chaining can be accomplished by setting all unknown values to Untested and again going through forward chaining from Block 162 to Block 182.

Figure 2D:
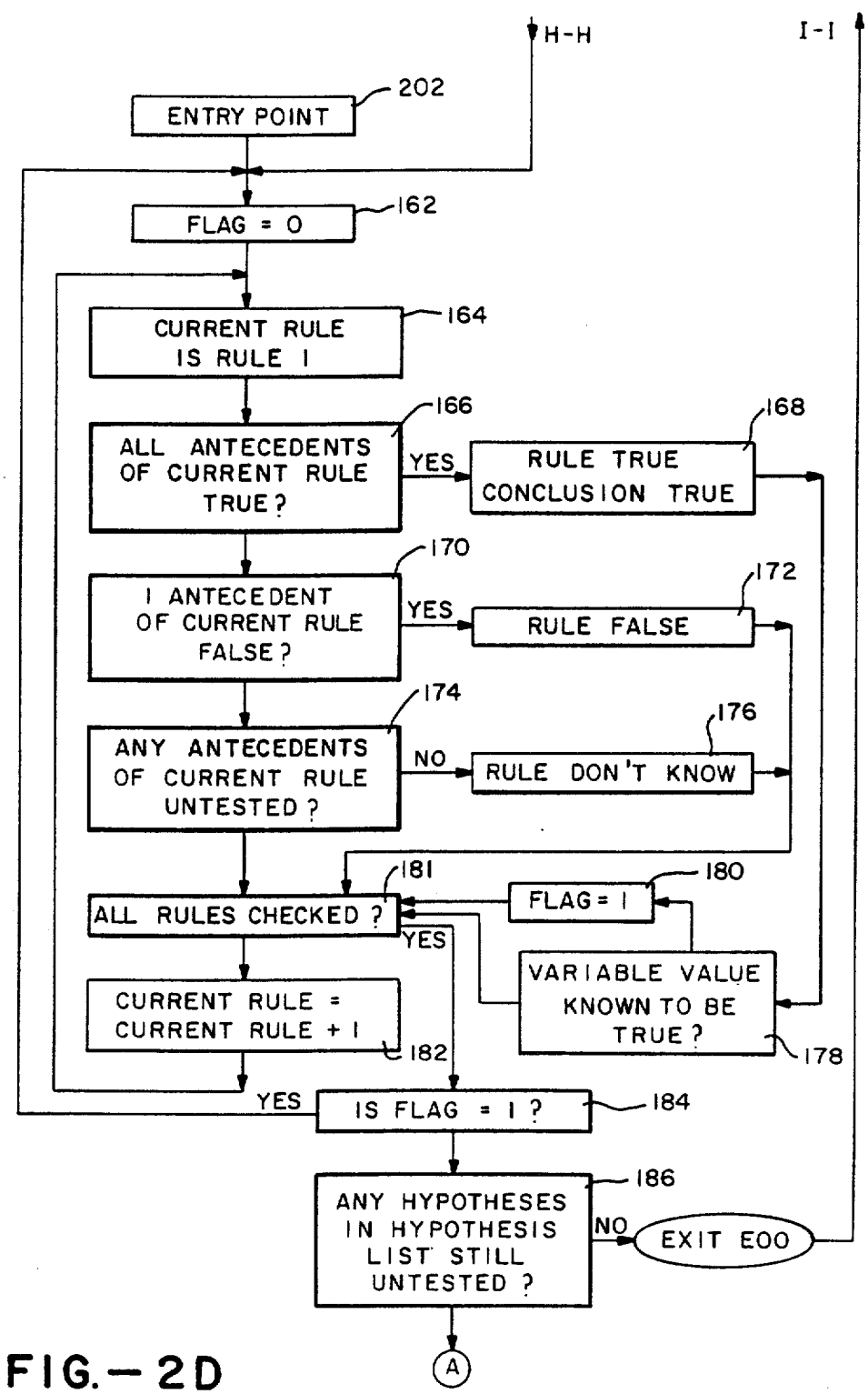

A further structure which save processing time and makes the inference engine more efficient is the use of an automatic hypothesis list generator 200 as depicted in FIG. 3. The results of the automatic hypothesis list generator 200 are initially introduced into the inference engine at entry point 202 (FIG. 2D). Automatic hypothesis list generation is accomplished prior to the forward chaining. The automatic hypothesis list generator 200 is accomplished automatically and not prompted by the user. This structure is used for searching the entire rule tree to see where the tops of the tree and the bottoms of the tree are. In other words, the generator determines all variable names which are only listed as rule conclusions, which variable names and conclusions would be at the top of the tree or the goals, and additionally all variable names which are listed only as antecedents, which antecedents would be at the bottom of the tree.

It is understood that the tree is comprised of a collection of rules, with the rules at the top having conclusion variables that are not also antecedent variables and with the rules at the bottom having antecedent variables which are not conclusion variables. Accordingly, there are fewer rules at the top of the tree and more rules at the bottom of the tree.

This task is accomplished by first setting all variable Types 0 as demonstrated in block 204. Then all hypotheses are set to 0 as demonstrated in block 206. In blocks 208 and 210, all the 256 rules are examined to see if the conclusions of the rules are found only as conclusion variables and not as antecedent variables of other rules. If this is the case, the variable is designated Type 1 (with a value of 1). Then at Block 212 a determination is made as to whether any variable is ever an antecedent. If this is the case a value of 2 is added to that variable's type. Thus, if a variable is a conclusion and an antecedent, the variable Type is 3 (1+2=3). Thus, all variables are valued with Types 1 or 2 or 3. Block 214 compiles a hypothesis variable list including all variable names which are only conclusions. The hypothesis count is then set by block 216 and the hypothesis list generation is complete at block 218.

The inference engine 56 further includes a knowledge based automatic sequencing structure which sequences between knowledge bases as between knowledge base 66 and knowledge base 68, and between knowledge base 68 and knowledge base 70, and so on. This sequencing structure is depicted in FIG. 4 and identified by the numeral 250. This sequencing can occur after a first inference has been completed on a first knowledge base such as knowledge base 0, KB0, identified by number 66 and is determined by block 252. This being the case, the values of the listed hypotheses (as distinguished from the sub-hypotheses) determined for knowledge base 0, KB0, are transferred to the second knowledge base, knowledge base 1, KB1, in block 68 as values for the corresponding numbered variables in KB1. In knowledge base 1, KB1, all the variable values are set to Untested by block 256. The variable values from knowledge base 0 (whether hypothesis variables, conclusion variables or antecedent variables), KB01 and block 66, are then used as the current variable values in knowledge base 1, KB1 and block 68 for the correspondingly numbered variables. Blocks 260 and 262 then start the inferencing process again using the values of knowledge base 0, KB0, and block 66. Forward chaining (Blocks 162-182) is then first accomplished on KB1 in order to assign values to as many rules as possible, based on the values from KB0, greatly increasing the efficiency of inferencing of KB1.

Accordingly with such a process it can be understood that the conclusions of one knowledge base module can be used as the inputs of a second knowledge base module and thus that, using this technique, a large problem can be solved quickly and efficiently by breaking it down into smaller segments each of which can be conveniently handled by a knowledge base.

FIG. 5 depicts alternate structure for evaluating a single rule, and assigning a value thereto, with eight antecedents using a forward chaining technique. The structure of FIG. 5 includes eight decoders, 302 through 316, which represent the antecedents of the rule. Decoders 302 to 316 are 2 of 4 decoders with an output line for the Unknown value not shown. True values of the decoders are communicated to And gate 318, False values communicated to Or gate 320 and Untested values communicated to Or gate 322. The inverses of outputs from gate 318, 320 and 322 are communicated to And gate 324. The inverses from the outputs of gates 318, 320 and 324 are communicated to And gate 326. The output from gate 324 is communicated to the multiplexer 328 on line 0 and represents the Untested value. The output from gate 320 is communicated to the multiplexer 328 on line 1 and represents the False value of the conclusion of the rule. The output of gate 318 is communicated to the multiplexer 328 on line 2 and represents the True conclusion of the rule. Finally the output of gate 326 is communicated to the multiplexer 328 and represents the Unknown value for the conclusion of the rule (line 3).

FIG. 6 represents an alternate embodiment of the structure of the invention for evaluating variables (hypotheses) based on rules and assigning values to said variables. This structure is identified by number 400. Structure 400 of FIG. 6 represents the evaluation of one variable or hypothesis using 4 matching positive rules and 4 matching negative rules. A "star" in FIG. 6 represents the negative rule bundle pathway. In FIG. 6, decoders 402 to 408 represent the conclusion values of 4 matching negative rules, while decoders 410 through 416 represent the conclusion values of 4 matching positive rules. Each decoder is a 2 by 4 decoder with the output lines representing True, False and Untested values, the Unknown value not being shown. The True cut puts from the 4 positive rule decoders 410 through 416 are provided to Or gate 418. The False outputs from the 4 positive rule decoders 410 to 416 are provided to And gate 420. The 4 False outputs from the negative rule decoders 402 to 408 are provided to And gate 422 with the 4 True outputs of negative rule decoders 402 to 408 provided to Or gate 424. Finally Or gate 426 obtains the 8 Untested outputs from the 8 decoders 402 through 416.

And gate 430 receives the inverted output of gate 420 and the output of gate 422 and provides an output to gate 428. Or gate 428 receives the outputs from And gate 430 and Or gate 418 and provides an output on line 2 to the multiplexer 440 in the True position. And gate 434 receives the output from gate 424 and the inverted output from gate 418. Gate 434 provides an output to gate 432 along with the output from gate 420. The output of gate 432 is provided to line 1 which is provided to multiplexer 440 in the False position.

And gate 436 receives inverted outputs from gates 426, 432, and 428, and provides an output along line 0 to multiplexer 440 in the Untested position. Finally, And gate 438 receives the inverted values from gates 436, 432, and 428 to provide an output along line 3 to the Unknown position of multiplexer 440. The multiplexer 440 in turn determines the hypothesis conclusion according to the backward chaining analysis provided by structure 400.

Industrial Applicability

The purpose of this section is to describe in full detail the operation of the expert knowledge system development tool. This shall be accomplished by examination of how the inference engine functions when presented with different knowledge bases.

| Example 1. One Rule One Hypothesis |
|---|
| 3 FRED IS OK |
| IF |
| 0 |
| 0 |
| 0 |
| 0 |
| 0 |
| 2 ITS AFTER 2PM |
| 1 THE DOCTOR DIDN'T CALL |

The inference is started with variable 3 (the conclusion of this rule) as the only hypothesis.

STEP 1

The inference engine finds there is one hypothesis, and that it does not already have a value (values are True, False, Unknown and Untested) for the hypothesis variable (Variable 3). (If Variable 3 is found to have a value already, the following steps are unnecessary, and the inference engine goes directly to Step 10).

STEP 2

The inference engine determines there is one rule available which can be used to make a conclusion about the hypothesis, namely the example rule above. Furthermore, the inference engine finds that the rule does not have a value yet.

STEP 3

The inference engine tries to give the rule a value, and examines all the variables (1 and 2) on the "IF" side of the rule. The inference engine looks at all of the values and determines if there is enough information to conclude whether or not this rule can be used to make some conclusion about the hypothesis. Because the inference process has just begun, both "IF" variables have no value.

STEP 4

The inference engine uses the first of the "IF" variables (antecedent values) it finds having no value (always bottom up), in this case, variable or antecedent 1, and makes that variable into a new hypothesis or subhypothesis. In the process of setting up a different variable as a new hypothesis, the inference engine must remember to come back to its previous hypothesis. The inference engine stacks up the current hypothesis for further reference, and takes on whichever variable is needed to evaluate as the current hypothesis. The result of this stacking process is visible in the goal path window of Chart 5. At this point, the inference engine can be said to be one level deep in the inferencing process.

STEP 5

The inference engine is in a situation which is similar to Step 1. There is a hypothesis which does not have any value as yet. The inference engine searches for other rules that can be used on the new hypothesis. However, there are no rules which have variable 1 as a conclusion.

STEP 6

The inference engine now asks a question about variable 1. There is really no alternative. Without some information about variable 1, the antecedent, the inference engine can make no conclusions about using the rule to evaluate variable 3, the conclusion. If there were rules around concluding variable 1, these would be used. Since there is no other information about variable 1 available, the inference engine asks: Is it True that "It's after 2 pm."

STEP 7

This testing process brings a reply by the user (or external device being queried the system) of yes, no, or unknown. The answer supplied to the inference engine about variable 1 will partly determine what happens next, because after each external world query, the inference engine returns to STEP 3 and tries to use the rule if possible (if enough information is now available about the "IF" variables).

STEP 8

Assuming the answer is "no" in Step 7, the inference engine assigns a value of False to variable 1, and finds there is enough information about the "IF" side of the rule to make a decision about using the rule. The rule is False. If one "IF" variable is False, there is no way that rule can be evaluated other than as False. Thus the inference engine will not look at any further variables within that rule.

STEP 9

The inference engine now takes back its old hypothesis and starts over evaluating variable 3. The rule now has a value to apply to the conclusion variable (the hypothesis). In this case the rule value is False. The hypothesis is assigned the value of False according to the value of the conclusion, variable 3, the only rule available.

STEP 10

The inference engine looks to see if there are any other hypotheses lined up for evaluation which do not have values yet. In this example there are none, so the inference process is complete.

EXAMPLE 1

Part 2

This example considers when antecedent, variable 1, has a "yes" value.

STEP 7

Set variable 1 to a "yes" value.

STEP 8

The inference engine assigns the value True to variable 1, and examines all the "IF" variables again to see if a value can be assigned to the rule.

STEP 9

Not enough information is yet available about the "IF" variables to assign a value to the rule, so the inference engine uses the next unevaluated "IF" variable (variable 2) and makes it into the hypothesis.

STEP 10

Because antecedent variable 2 has no value, and no rules are available to help evaluate it, the inference engine stops and asks a question about variable 2. Again, it is possible that this second "IF" variable can be answered yes, no, or unknown. Whatever way this question is answered, the inference process will have enough data about this rule to give the rule a value.

If the answer is True, then variable 2 gets a True value, the rule gets a True value, and therefore the original hypothesis gets a True value (there is one rule, and it does apply since both "IF"'s are True).

If the answer is False, then variable 2 gets a false value, the rule gets a False value, and the original hypothesis variable 3 also gets a False value.

If the answer is Unknown, then variable 2 gets an Unknown value. One "IF" is True and one "IF" is Unknown, the result of which is Unknown for the rule and the hypothesis.

STEP 11

The inference process is complete (there are no other hypotheses).

From this two-part example it can understand that the process of evaluating the hypotheses is partly backward. Rules are selected which have a conclusion matching the hypothesis, and then their "IF" sides may become the subject of a search for deeper rules, and so on. Forward conclusions are made when information enough is provided to a deep rule.

Note that both rules and variables get evaluated. The "IF" variables in a rule may not need to be completely evaluated at all, if any one is found to be False, that is enough information to make a conclusion. Otherwise, data about each value is required. The rule evaluating process (backward chaining) makes use of the antecedent or variable evaluating process (forward chaining). Then the antecedent or variable evaluating process makes use of the rule evaluating process. Cyclical methods of this kind are called recursive.

The following Chart 6 shows a truth table for the rule-evaluating process, using a rule with two "IF" variables like the one in the example.

CHART 6
Single Rule Truth Table (Two Input)

| | LOGICAL VALUE | | | | | |
|---|---|---|---|---|---|---|
| Rule | F | F | D | D | D | T |
| Conclusion variable 3 | F | F | D | D | D | T |
| IF antecedent Variable 2 | X | F | D | T | D | T |
| IF antecedent Variable 3 | F | X | T | D | D | T |

X - does not matter, not necessarily any value at all.
F - False.
D - Unknown, Don't Know.
T - True.

Note rule values are same as conclusion values in the one-rule case. There is only one condition for a rule value of True, that is that all "IF" variables must be True. A single False variable always makes the rule False, even if other variables have not even been evaluated.

Multiple Rules

More complex situations arise when there are groups of rules having a conclusion in common (or with logically opposite conclusions).

In this situation, the group of rules is segregated into two subgroups, one of which has the actual conclusions which exactly matches the hypothesis, and one which has opposite conclusions. The rules are then ordered numerically.

The first thing taken into account is the group of positive rules (those whose conclusions exactly match the current hypothesis). If no value can be assigned to the variable based on those rules, then the second group comes into play. These are rules which have conclusions logically negative to the current hypothesis. The inference engine uses these rules to assign a value to the negative of the current hypothesis.

EXAMPLE 2

Two Rules One Positive and One negative

| Positive Rule | Negative Rule |
|---|---|
| 3 Fred is OK | 131 NOT Fred is OK |
| IF | IF |
| 0 | 0 |
| 0 | 0 |
| 0 | 0 |
| 0 | 0 |
| 0 | 0 |
| 2 The Doctor Didn't Call | 0 |
| 1 Its after 2pm | 4 Doctor's says test positive |

In this example, what matters is the values assigned to the two rules, both of which values may come into use when assigning a value to the hypothesis (variable 3, as before) When variable 3 is the current hypothesis, the rule gathering process will find both of these rules relevant. The first rule can directly impact on the hypothesis and the second rule can impact on the opposite of the hypothesis. Variables 3 and 131 are opposites. If variable 3 is True, then 131 is False. If one of them is Unknown, then so is the other.

As indicated previously, it is always possible to invoke the negative of any variable (1-127), by referring to a variable with a number 128 greater than its opposite (e.g., 8 and 136 are matching mutual negatives) of one another; so are 120 and 248). Advisor then allows rules related to a variable and its negative both to be used in evaluating each other.

The sequence of events during an analysis of the two-rule example is as follows.

STEP 1

The inference engine needs to evaluate variable 3, the hypothesis. During the search for relevant rules, both of the above rules are found and the inference engine attempts an evaluation of Rule 1.

STEP 2

The inference engine subjects Rule 1 to evaluation (see Example 1) until some value (T, F, or D) is assigned to Rule 1.

STEP 3

If either a T or F value is assigned to Rule 1, there is enough information to make a conclusion about the hypothesis without recourse to Rule 2. The positive rule alone suffices in such a situation.

STEP 4

If Rule 1 obtains a value of D, the negative Rule 2 is evaluated. For this example, it is assumed that Rule 2 is assigned a value of T.

STEP 5

The inference engine now has a value of D for Rule 1, and a T for Rule 2. The inference engine considers the T value of Rule 2 of greater importance (it will always conclude with a T or F when possible; D is equivalent to deferred judgement).

STEP 6

The inference engine notes no other rules need evaluation. The T value of Rule 2 is used to assign a value of T to variable 131.

STEP 7

Variable 3 (our hypothesis) is automatically assigned a value of F (its negative variable 131 is True, so variable 3 must be False).

Thus whenever the sum total of information (values) available for the positive rules is insufficient to evaluate common conclusion variables of the rules, negative rules may be used and may, by themselves, provide the information required to make a conclusion about the positive variable.

The following truth table for this example shows combinations of rule values and their consequences for evaluation of the hypothesis.

Truth Table, Example 2
Positive and Negative Rule Effects

|  | VALUES | | | | |
|---|---|---|---|---|---|
| Variable 3 | T | F | F | T | D |
| Variable 131 | F | T | T | F | D |
| Rule 1 POS | T | F | D | D | D |
| Ruse 2 NEG | X | X | T | F | D |

Like the situation in Example 1, the inference engine may not need values at all for Rule 2 if the value of Rule 1 is enough information. It is only necessary to evaluate Rule 2 if the value of Rule 1 is D. Rule 2 then dominates the outcome.

The situation becomes only slightly more complex when either the positive or negative bundle has more than one rule. In such a case, the inference engine will evaluate the entire positive bundle of rules and resort to evaluating the negative bundle only if necessary. It is instructive to note what combination of rule values in the positive bundle leads to a need for evaluating the negative bundle.

Example 3
Two Positive Rules, One Negative Rule

| 3 Fred is OK | 3 Fred is OK | 131 NOT FRED is OK |
|---|---|---|
| IF | IF | IF |
| 0 | 0 | 0 |
| 0 | 0 | 0 |
| 0 | 0 | 0 |
| 0 | 0 | 0 |
| 0 | 0 | 0 |
| 2 ... | 0 | 0 |
| 1 ... | 5 ... | 4 ... |

The truth table reveals:

|  | VALUES | | | | | | | | | | |
|---|---|---|---|---|---|---|---|---|---|---|---|
| Variable 3 | T | T | F | F | F | F | T | T | T | D | D | D |
| Variable 131 | F | F | T | T | T | T | F | F | F | D | D | D |
| Rule 1 (POS) | X | T | F | D | F | D | D | F | D | D | F | D |
| Rule 2 (POS) | T | X | F | F | D | D | F | D | D | F | D | D |
|  |  |  |  |  | (evaluated first) |  |  |  |  |  |  |  |
| Rule 3 (NEG) | X | X | X | T | T | T | F | F | F | D | D | D |

Again, X means that the value is unimportant to the outcome. The negative rule need not be used in the evaluation process unless the positive bundle (rules 1 and 2) leaves in an Unknown situation. Then the negative bundle (Rule 3) is used and dominates the outcome for the two variables in question. The negative logic route is only used when necessary to try and resolve an Unknown into a solid True or False value.

It is worthwhile to look at this last truth table to see what happens during evaluation of just a positive bundle. The table, when Rule 3 (the negative rule) is not available, is as follows:

| Variable 3 | T | T | F | D | D | D |
| Variable 131 | F | F | T | D | D | D |
| Rule 2 (POS) | T | X | F | D | F | D |
| Rule 1 (POS) | X | T | F | F | D | D |

Within a bundle, a single True rule is enough information to assign a True value to the conclusion. When all values of rules in the bundle are False, the conclusion variable is also rendered False. All other combinations of rule values within the bundle lead to Unknown outcomes for the conclusion variable of that bundle.

The same methods are used to manipulate any bundle, whether it is positive or negative. The positive bundle has priority of evaluation, but the negative bundle gets handled the same way (when necessary) as outlined in the previous paragraph. When the negative bundle is used by the inference engine, it simply has the opposite outcome on the actual hypothesis than would the results of a positive bundle. The opposite of True is False, the opposite of False is True, and the opposite of Unknown is Unknown.

Other aspects and advantages of the invention can be obtained from a review of the claims and figures. While the application describes a preferred embodiment of the invention, it is to be understood that other embodiments are possible within the scope of the invention and claims.

What is claimed is:

1. An expert knowledge system development tool comprising a computer with means for storing a knowledge base and inference engine means for inferencing with respect to at least one hypothesis variable from said knowledge base storing means comprising:
    said knowledge base storing means including:
        means for defining a plurality of positive and negative rules wherein said rules defining means includes:
        (a) means for defining at least an antecedent variable for each of said rules and means for defining a conclusion variable for each of said rules; and
    said inference engine means including:
        (a) means for storing a hypothesis variable list containing said at least one hypothesis variable;
        (b) means for automatically selecting and ordering said rules stored in said knowledge base storing means to establish the structures of said rules into a rule tree by determining if any conclusion variable is also an antecedent variable;
        (c) means for selecting and sorting said rules ordered in said rule tree that have conclusion variables which match each hypothesis variable into one bundle and said rules that have conclusion variables which match the negative of each hypothesis variable into another bundle; and
        (d) means for analyzing the selected said rules with respect to one another for each bundle separately in order to determine a value for each hypothesis variable.

2. The expert system development tool of claim 1 wherein said means for automatically selecting and ordering said rules includes:
    means for establishing a type designation for each variable;
    means for adding a value of one to the type designation for all conclusion variables;
    means for adding a value of two to the type designation for all antecedent variables so that conclusion variables which are also antecedent variables have a type designation of three;

means for ordering the rules according to the value of the type designation.

3. The expert knowledge system development tool of claim 1 wherein said means for selecting rules includes means for ordering selected positive rules first and selected negative rules second.

4. The expert knowledge system development tool of claim 1 wherein said means for analyzing the selected rules to determine the value of each hypothesis variable includes:

first means for assigning a value of True to the hypothesis variable if there is one positive rule with a conclusion variable which has a value of True;

second means for assigning a value of False to the hypothesis variable if there is one negative rule with a conclusion variable which has a value of True;

third means for assigning a value of False to the hypothesis variable if all positive rules have a conclusion variable which has a value of False;

fourth means for assigning a value of True to the hypothesis variable if all negative rules are False;

fifth means for assigning a value of Unknown if all positive and negative rules have conclusion variables with Unknown values.

5. The expert knowledge system development tool of claim 4 including:

sixth means for assigning a value of Untested to any rule that does not have a value of one of True, False, and Unknown.

seventh means for selecting and analyzing Untested rules when value of the hypothesis variable is other than one of True, False and Unknown.

6. The expert knowledge system development tool of claim 5 wherein said seventh means for selecting and analyzing Untested rules include:

eighth means for assigning a value of True to an Untested rule which has all antecedent variables with a value of True;

ninth means for assigning a value of False to an Untested rule if one antecedent variable of said rule is False;

tenth means for assigning a value of Unknown to an Untested rule if no antecedent variable of the Untested rule remain Untested;

eleventh means for returning to the means for analyzing selected rules if a value of one of True, False and Unknown is not assigned to the Untested rule.

7. The expert, knowledge system development tool of claim 6 including:

means for returning to the means for storing a hypothesis variable list and for replacing a hypothesis variable of the hypothesis variable list with a first Untested antecedent variable of a Untested rule if the value of the Untested rule is other than one of True, False and Unknown.

8. The expert knowledge system development tool of claim 1 including:

means for analyzing the antecedent variable of each rule to determine a value for each rule.

9. The expert knowledge system development tool of claim 8 wherein said means for analyzing the antecedent variable of each rule to determine a value for each rule includes:

first means for assigning a value of True to the conclusion variable of a rule and to the rule if all antecedent variable of the rule are True;

second means for assigning a value of False to a rule if one antecedent variable of the rule is False; and third means for assigning a value of Unknown to a rule if no antecedent variable remaisn tested.

10. The expert knowledge system development tool of claim 9 including:

means for analyzing the value of each rule at least once; and means for reanalyzing the value of each rule should any conclusion variable be assigned a value of True during the previous analysis.

11. The expert knowledge system development tool of claim 8 wherein the means for analyzing the antecedent variable of each rule include means for applying a forward chaining process to each rule.

12. The expert knowledge system development tool of claim 1 wherein said means for analyzing the selected rules with respect to each other includes means for applying a backward chaining process between the selected rules.

13. The expert system development tool of claim 1 including means for initially selecting all conclusion variables that are not similar to any antecedent variable and for selecting all conclusion variables that are similar to any antecedent variables.

14. The tool of claim 1 wherein said knowledge base storing means includes:

means for storing a set of logical variables.

15. An expert knowledge system development tool method for inferencing with respect to at least one hypothesis variable from a knowledge base with an inference engine including the steps of:

defining a plurality of positive and negative rules;

defining at least an antecedent variable for each of said rules and a conclusion variable for each of said rules;

storing a hypothesis variable list containing said at least one hypothesis variable;

automatically selecting and ordering said rules to establish the structure of said rules into a rule tree by determining if any conclusions are also antecedent;

selecting and sorting said rules ordered into said rule tree that have conclusion variables which match each hypothesis variable into one bundle and the negative of each hypothesis variable into another bundle of said list;

inferencing with respect to the selected rules with respect to one another for each bundle separately in order to determine a value for each hypothesis variable.

16. The expert system development tool method of claim 15 wherein said step of automatically selecting and ordering said rules includes:

establishing a type designation for each variable;

adding a value of one to the type designation for all conclusion variables;

adding a value of two to the type designation for all antecedent variables so that conclusion variables which are also antecedent variables have a type designation of three;

ordering the rules according to the value of the type designation.

17. The method of claim 15 wherein said step of selecting rules includes the step of ordering selected positive rules first and selected negative rules second.

18. The method of claim 15 wherein the step of analyzing the selected rules to determine the value of each hypothesis variable includes the sequential steps of:
   first, assigning a value of True to the hypothesis variable if there is one positive rule with a conclusion variable which has a value of True;
   second, assigning a value of False to the hypothesis variable if there is one negative rule with a conclusion variable which has a value of True, and if a value is not assigned by the first step;
   third, assigning a value of False to the hypothesis variable if all positive rules have a conclusion variable which has a value of False, and if a value is not assigned by the second step;
   fourth, assigning a value of True to the hypothesis variable if all negative rules are False, and if a value is not assigned by the third step;
   fifth, assigning a value of Unknown if all positive and negative rules have conclusion variables with Unknown values, and if a value is not assigned by the fourth step.

19. The method of claim 18 including the sequential steps of:
   sixth, assigning a value of Untested to any rule that does not have a value of one of True, False, and Unknown, and if a value is not assigned by the fifth step;
   seventh, selecting and analyzing Untested rules when value of the hypothesis variable is other than one of True, False and Unknown.

20. The method of claim 19 wherein said seventh step of selecting and analyzing Untested rules include the sequential steps of:
   eighth, assigning a value of True to an Untested rule which has all antecedent variables with a value of True;
   ninth, assigning a value of False to an Untested rule if one antecedent variable of said rule is False, and if a value is not assigned by the eighth step;
   tenth, assigning a value of Unknown to an Untested rule if no antecedent variable of the Untested rule remain Untested, and if a value is not assigned by the ninth step; and
   eleventh, returning to the means for analyzing selected rules if a value of one of True, False and Unknown is not assigned to the Untested rule.

21. The method of claim 20 including the steps of:
   returning to the step of storing a hypothesis variable list; and
   replacing a hypothesis variable of the hypothesis variable list with a first Untested antecedent variable of a Untested rule if the value of the Untested rule is other than one of True, False and Unknown.

22. The method of claim 15 including the step of:
   inferencing with respect to the antecedent variable of each rule to determine a value for each rule.

23. The method of claim 22 wherein said step for analyzing the antecedent variable of each rule to determine a value for each rule includes the sequential steps of:
   first, assigning a value of True to the conclusion variable of a rule and to the rule if all antecedent variables of the rule are True;
   second, assigning a value of False to a rule if one antecedent variable of the rule is False and if a value is not assigned by the first step; and
   third, assigning a value of Unknown to a rule if no antecedent variables remain tested.

24. The method of claim 23 including the steps of:
   analyzing the value of each rule at least once; and
   reanalyzing the value of each rule should any conclusion variable be assigned a value of True during the previous analysis.

25. The method of claim 22 wherein the step of inferencing with respect to the antecedent variable of each rule to determine a value for each rule occurs before the step of inferencing with respect to the selected rules to determine a value for each hypothesis variable.

26. The method of claim 22 wherein the step of inferencing with respect to the selected rules and the step of inferencing with respect to the antecedent variable of each selected rule occur alternatingly until a value for each hypothesis variable is determined.

27. The method of claim 15 wherein said step of analyzing the selected rules with respect to each other includes the step of applying a backward chaining process between the selected rules.

28. The method of claim 15 wherein the step of analyzing the antecedent variables of each rule includes the step of applying a forward chaining process to each rule.

29. The method of claim 15 including the steps of:
   selecting all conclusion variables that are not similar to any antecedent variables; and
   selecting all conclusion variables that are similar to any antecedent variables.

30. An expert knowledge system development tool comprising a computer with means for storing a plurality of knowledge bases and inference engine means for inferencing with respect to at least one hypothesis variable from said knowledge bases storing means including:
   means for defining a plurality of positive and negative rules wherein said rules defining means includes:
   (a) means for defining at least an antecedent variable for each of said rules and means for defining a conclusion variable for each of said rules; and
   said inference engine means including:
   (a) means for storing a hypothesis variable list containing said at least one hypothesis variable;
   (b) means for selecting and sorting rules that have conclusion variables which match each hypothesis variable into one bundle and rules that have conclusion variables which match the negative of each hypothesis variable into another bundle;
   (c) means for analyzing the selected rules with respect to one another for each bundle separately in order to determine a value for each hypothesis variable; and
   means for automatically sequencing between knowledge bases including:
   (a) means for defining a first knowledge base having a first list of numbered variables that can be at least one of conclusion variables and antecedent variables;
   (b) means for defining a second knowledge base having a second list of numbered variables, corresponding to the first list of numbered variables, that can be at least one of conclusion variables and antecedent variables; and (c) means for using the determined value of each variable for said first list to be used for the initial values of the corresponding numbered variable of said second list.

31. An expert knowledge system development tool method for inferencing from a plurality of knowledge bases with an inference engine including the steps of:

defining a plurality of positive and negative rules;

defining at least an antecedent variable for each of said rules and a conclusion variable for each of said rules;

storing a hypothesis variable list containing said at least one hypothesis variable;

selecting and sorting rules that have conclusion variables which match each hypothesis variable into one bundle and the negative of each hypothesis variable into another bundle of said list;

inferencing with respect to the selected rules with respect to one another for each bundle separately in order to determine a value for each hypothesis variable; and automatically sequencing between knowledge bases including the steps of:

(a) providing a first knowledge base having a first list of numbered variables that can be conclusion variables and antecedent variables;

(b) providing a second knowledge base having a second list of numbered variables, corresponding to the first list of numbered variables, that can be conclusion variables and antecedent variables;

(c) using the determined value of each variable for said first list as the initial values of the corresponding numbered variable of said second list.

* * * * *